United States Patent [19]
Maeda

[11] Patent Number: 4,809,462
[45] Date of Patent: Mar. 7, 1989

[54] METHOD OF EXTERMINATING INSECTS UNDER THE FLOOR OF A HOUSE OR BUILDING

[76] Inventor: Hiroshi Maeda, No. 26-2 Suberiiwahama, Ookuwajima, Muya-cho, Naruto-shi, Tokushima-ken, Japan, 772

[21] Appl. No.: 906,015

[22] Filed: Sep. 11, 1986

[30] Foreign Application Priority Data

| Jan. 25, 1986 | [JP] | Japan | 61-9444[U] |
| Apr. 26, 1986 | [JP] | Japan | 61-97667 |
| Apr. 28, 1986 | [JP] | Japan | 61-100501 |
| Jun. 4, 1986 | [JP] | Japan | 61-130977 |

[51] Int. Cl.$^4$ ............................................. A01M 1/20
[52] U.S. Cl. ..................................... 43/124; 43/132.1
[58] Field of Search ............... 43/132.1, 124; 424/77, 424/33, 34, 200; 814/919

[56] References Cited

U.S. PATENT DOCUMENTS

| 2,073,779 | 3/1937 | Bramsen | 43/124 |
| 2,135,391 | 11/1938 | Fellman | 43/124 |
| 2,138,182 | 11/1938 | Lipthrott | 43/124 |
| 2,899,771 | 8/1959 | Burris, Jr. | 43/124 |
| 3,614,841 | 10/1971 | Query | 43/124 |
| 3,676,949 | 7/1972 | Ramsey | 43/124 |
| 4,476,515 | 10/1984 | Coffee | 43/132.1 |
| 4,648,202 | 3/1987 | Renth | 43/124 |

FOREIGN PATENT DOCUMENTS

0025308  2/1984  Japan .................... 424/200

Primary Examiner—Nicholas P. Godici
Assistant Examiner—Karen Skillman
Attorney, Agent, or Firm—Wenderoth, Lind & Ponack

[57] ABSTRACT

A method of exterminating harmful insects under the floor of a house or building comprises spraying insecticide into the enclosed area under the floor of the house or building. For the purposes of this patent application the meaning of the word insecticide encompasses substances which deter insect presence as well as substances which kill insects. The insecticide used, is in the form of a fine adhesive powder which is loaded into an airtight dispenser. The dispenser has an opening for the insecticide to pass through. The opening is initially blocked by insecticide while pressure inside the dispenser is increased. Subsequently, insecticide is forced out the dispenser opening and delivered to a nozzle which sprays the insecticide under the building floor at a high exit velocity. The air in the enclosed area under the floor of the building is stirred up by the fluid energy delivered by the jet of fine powser insecticide. The insecticide mixes with the disturbed air to be distributed to, and to coat exposed surfaces and adhere in crevices in the area under the building floor.

9 Claims, 4 Drawing Sheets

METHOD OF EXTERMINATING INSECTS UNDER THE FLOOR OF A HOUSE OR BUILDING

BACKGROUND OF THE INVENTION

The present invention concerns simple methods of insecticide dispersal to exterminate termites and similar harmful insects living in or traversing the area under a house or building.

Application of insecticide under buildings and houses to exterminate termites is currently performed, and has been performed in the past. Former methods require workers to wear totally protective clothing, gloves, and gas masks, crawl under the building, and disperse chlordane or other insecticides over the entire exposed ground and/or coat wooden beams such as the groundsills with insecticide.

These former methods of applying insecticide are not only extremely laborious, but also require exterminators to work for long periods in the confined area under a building while breathing poisonous insecticide fumes. Hence, the work environment is extremely bad. Furthermore, These methods have the drawback that complete insecticide coverage of very cramped areas under some buildings is impossible because not all small, confined regions can be reached to apply insecticide.

In particular, it is extremely difficult for a worker, inside the area under a building, to apply insecticide with a brush or similar applicator in narrow gaps such as those between the floor boards. It is possible to apply liquid insecticide to the gaps and crevices even in confined areas by spraying. However, with this method atomized droplets of the sprayed insecticide float in the air under the building, and unfortunately, gas masks can not completely eliminate the poisonous particles. Hence, working conditions are made worse by making the worker breathe insecticide droplets. For the worker's protection, liquid insecticide application is restricted to organophosphate type insecticides with dispenser pressures of 5 Kg/square cm and below. It is impossible for exterminators to work for long periods in this type of hazardous environment, and it is therefore impossible to entirely cover the area under a building with insecticide by these methods.

In cases where total coverage is impossible, termites will establish a route into the home or building through the area where insecticide has not been applied. For example, even though almost all of the area under a building may be covered with insecticide, one uncovered area will drastically reduce the effect of the overall extermination.

By former methods where workers enter the enclosed area under a building and disperse and/or apply insecticide with a brush, not only is it impossible to entirely cover all the exposed surfaces, but it is clearly impossible to apply insecticide in all the narrow crevices, as well as open areas exposed only through narrow crevices.

For these reasons, recently adopted methods of insecticide application basically involve coating the entire surface of the ground under the building with organic salt type insecticides such as chlordane, which do not degrade easily, and hence remain effective for extremely long periods. These methods take advantage of the ease of application to the ground surface, and prevent insect penetration at that point.

Today, these techniques are being re-evaluated based on conjecture that they may bring about serious environmental pollution problems in the future. However, regardless of future environmental problems, no improved harmful insect extermination methods have been developed to replace these techniques, and they are still used for termite extermination.

As mentioned, insecticides like chlordane have the special attribute that they remain on or in the ground without degrading, and hence provide long term effectiveness against harmful insects. On the other hand, it is impossible to keep the insecticide within the area under the building forever, and the substance inevitably seeps into the ground water along with rain water to pollute plants and vegetables, domestic animals which feed on the plants, and humans that eat the plants and animals. According to recent reports, chlordane has been detected even in animals of the South Pole, which is assumed to be the most unpolluted area on earth.

It has recently been proposed that organophosphates be used instead of organic salt type insecticides. Organic salt type insecticides gradually accumulate in the human body over a long period, and when the accumulated quantity exeeds a critical value, severe impairment results without warning. By the time symptoms are recognized, it is too late for treatment, and recovery is impossible. Conversely, even a small quantity of organophosphate type insecticide attached to the skin or breathed into the body has a strong poisonous reaction which can be immediately treated. However, even though treatment can normally be performed in time, since organophosphates are extremely poisonous to humans, workers must take preventive measures that would not even be considered using chlordane. During the application of organophosphates, people in the vicinity of the house or building as well as those in the building must be evacuated, and particular care must be taken to insure that atomized insecticide does not leak out of the enclosed area under the building.

An ideal harmful insect extermination method could be realized with an insecticide which degrades rapidly in the ground yet has sufficient strength to exterminate insects. Unfortunately, since such insecticides are applied to the ground, they loose effectiveness rapidly, and long term effective harmful insect extermination is impossible.

The inventor proposed that workers remain outside the area under the building, and that harmful insect penetration into the building be stopped at the foundation, the groundsills, the support beams, the floor beams, and the floor boards, rather than at the ground. With this in mind he has experimented with various application methods.

The first experiment attempted to obtain complete coverage by spraying liquid insecticide, atomized by compressed air pressure, from a nozzle inserted into the area under the building. Although insecticide coverage by this method was obtained in the vicinity of the nozzle, complete coverage of all the exposed surfaces in the enclosed area under the building could not be accomplished. The inventor performed many experiments varying the nozzle shape, the nozzle opening size, the compressed air pressure, etc., but was unable to realize complete insecticide coverage. However, these experiments made one effect clear. Namely, as the nozzle opening is made smaller and the compressed air pressure is increased, the atomized particles become smaller and remain airborne longer, and conversely as the nozzle opening is made larger and the air pressure is decreased, the ejected particles become larger and are less buoyant in the air. Although the small buoyant particles remain airborne for some time, complete insecticide coverage under the building is not obtained, and the large particles primarily fall to the ground in front of the nozzle.

From these results, the inventor reasoned that since the fine particles ejected from the nozzle possess considerable kinetic energy, this energy could be used to stir up the air underneath the building, and since the particles remain airborne for a fixed period, the particles would mix with, and be carried to all parts of the enclosed area under the building by the turbulent air. In this way, it would be possible to obtain complete insecticide coverage without entering the enclosed area under the building. However, attaining insecticide particle buoyancy and inducing turbulence in the air are reciprocal operations, and both could not be satisfactorily achieved simultaneously. This inverse relationship results for the following reason. Since the kinetic energy of atomized particles ejected from the nozzle is proportional to the particle mass and particle velocity squared, either the nozzle exit speed or the mass ejected from the nozzle must be increased to increase turbulence in the air. However, in order to increase the nozzle exit speed, the compressed air pressure is increased, and the particle size, and hence the particle mass is reduced. If the nozzle opening is increased to increase the particle mass, particle buoyancy suffers, and the particles fall earthward immediately after ejection. Consequently, simultaneous fulfillment of these reciprocal requirements, or even a satisfactory trade-off was impossible using an atomized liquid insecticide. Further, it was impossible to spray liquid insecticides into the air from a small nozzle and obtain a narrow jet of atomized insecticide. Hence it was impossible to transfer the fluid energy of a narrow high speed insecticide jet to accelerate the air enclosed in the area under the building in a given direction. As a result, liquid insecticides could not be dispersed to all points under the building by simultaneously stirring up the enclosed air, and mixing a buoyant insecticide mist in that turbulent air. Furthermore, liquid insecticides have the drawback that their adherence to objects is too strong. This property makes most of the liquid insecticide adhere to objects immediately in front of the nozzle prior to ever being transported to the rest of the area under the building.

In further experiments, the inventor was able increase the specific gravity of the ejected insecticide particles independent of the compressed air pressure by using a solid insecticide in powdered form, and was thus able to eject fixed sized particles at a high speed in a specific direction by using a high compressed air pressure. Also, by making the insecticide adhesion less than that of liquid insecticides, the inventor was successful in coating all surfaces, crevices, and areas accessible only through narrow crevices, from outside the enclosed area under the building, to a degree unimaginable by former methods.

Consequently, the first major objective of this invention is to provide a highly effective method of exterminating insects under the floor of a house or building, by which all exposed surfaces can be completely covered with insecticide applied by a simple procedure by workers outside the area under the building.

The inventor has previously developed a harmful insect exterminating trough (Japanese Patent Application No. 115241/1984), which is attached all along the foundation, is filled with insecticide, and prevents the intrusion of insects by killing those that contact the insecticide. To the extent that this trough can be attached to the foundation without any gaps, and can be filled with insecticide in a continuous line, excellent harmful insect deterent properties can be achieved.

However, this trough system has the disadvantage that it is a time consuming job to attach a trough or groove all along the foundation, and in cases where the concrete foundation surface is not planar, and/or the foundation takes on a complicated shape, it is very difficult to attach the trough without creating gaps between the trough and the foundation. In the event that a gap wide enough for insects to pass is formed between the foundation and the trough or groove, harmful insects will penetrate into the home or building through this gap, and the effectiveness of the insect barrier is thus, greatly reduced. Also, if there is a break in the continuous line of insecticide filling the trough, harmful insects will similarly penetrate into the home or building through this pathway. Therefore, this system has the disadvantage that extreme care must be taken to avoid gaps when attaching the trough to the foundation, and when loading insecticide into the trough, and hence, installation and insecticide application are time consuming and difficult.

Harmful insect barrier systems using liquid, rather than powdered insecticides have previously been developed (Japanese Patent Public Notice No. 3529/1979, Japanese Utility Model Public Notice No. 33289/1979). In these insect barrier systems, liquid insecticide is poured into a trough at one inlet point, and flows from that point to all parts of the trough. To insure that insecticide flows uniformly to all parts of the trough, the trough must be accurately fixed to the foundation such that it is level at all points. These systems thus have the disadvantage that installation of troughs, which are level throughout, is extremely labor intensive. They also have the disadvantage that foundation settling over time upsets the trough's levelness, and as a result insecticide may not flow to all parts of the trough.

As mentioned previously, in order to avoid pollution of the ground water, it is necessary to use insecticides which are not as long lasting as chlordane. When these short term insecticides are used, it becomes necessary to reapply insecticide every 5 or 10 years. Trough type insect barrier systems have the disadvantage that insecticide reapplication and long term maintenance are troublesome operations.

The second major objective of this invention is, therefore, to provide a method of exterminating insects under the floor of a house or building by establishing an unbroken barrier of insecticide all along the foundation. This objective would eliminate the disadvantages of present barrier systems by piling insecticide, without creating gaps, on the foundation, regardless of whether a trough is attached or not, and regardless of whether there are outcroppings and voids in the foundation or the foundation takes on a complicated shape.

Another major objective of this invention is to attach insecticide to, and completely cover the foundation, groundsills, support beams, floor beams, and floor boards, thus allowing extermination using insecticides which degrade in the ground over a short period, and drastically reducing environmental pollution.

Another major objective of this invention is to apply insecticide without requiring workers to enter the enclosed area under the building, thus allowing application even under low to the ground floors where workers cannot enter, as well as greatly improving working conditions by avoiding insecticide ingestion.

A further major objective of this invention is to use compressed air pressure to accelerate insecticide into the enclosed area under a building without introducing large quantities of air, and hence, to minimize the leakage of insecticide outside of that area during application.

A final major objective of this invention is to provide a method of exterminating insects under the floor of a house or building, which can maintain complete long term protection against harmful insects by simple insecticide reapplication.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE ILLUSTRATIONS

DETAILED DESCRIPTION

The following provides an illustrated description of a practical example of the present invention: a method of exterminating insects under the floor of a house or building.

Figure 1:
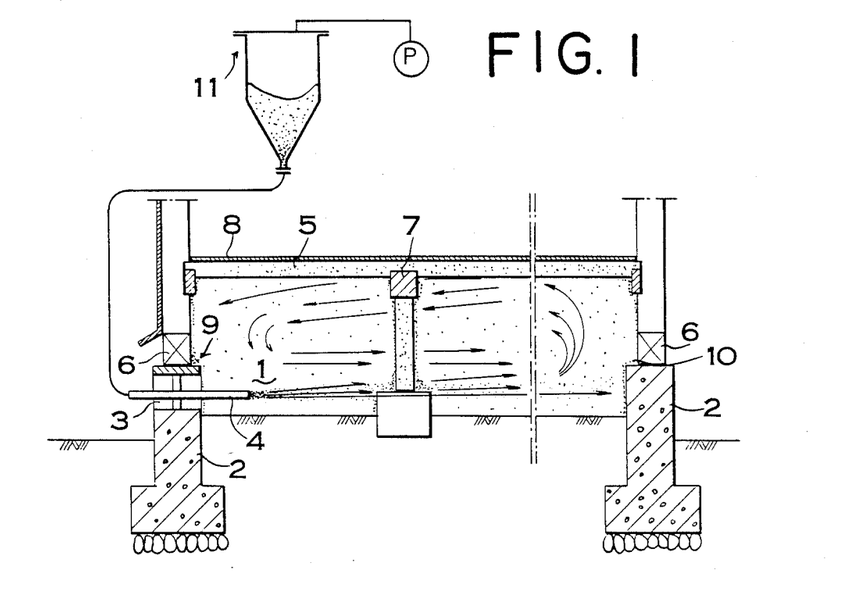
FIG. 1 is a cutaway view of an example of the use of this invention under the floor of a building.

As shown in FIG. 1, the end of a nozzle 4 is inserted into the enclosed area 1 under the floor of the building through a ventilation hole 3 in the foundation 2. Insecticide in a powdered form is sprayed, at a high exit velocity from the nozzle 4, by air pressure.

The insecticide used, is in the form of a fine powder, with the particle size chosen such that the particles will remain airborne for a given period. The average particle size is less than 100 mesh (where the mesh value indicates the size of a particle which will pass through a mesh with that number of mesh openings per square inch), or more desirably less than 200 mesh. Ideally, the particle size is chosen greater than 1 micron with an average size less than 200 mesh. The airborne particles, which mix, and spread with the disturbed air, have an adhesive property which facilitates contact with, and attachment to the concrete foundation 2, the wooden groundsills 6, the floor beams 5, the support beams 7, and the floor boards 8.

Insecticide in the powdered form has an apparent specific gravity greater than 0.6, and a single atomized particle of powdered insecticide has a specific gravity greater than that of a single atomized particle of liquid insecticide. It follows that powdered insecticide particles accelerated by air pressure and sprayed into the air possess a large kinetic energy. On the other hand, the particles of powdered insecticide also have an extremely large area to weight ratio resulting in large aerodynamic drag. Therefore, atomized insecticide particles do not quickly fall to the ground, but rather can remain afloat in the air under the building floor for a period of time.

The desirable apparent specific gravity of the powdered insecticide used in this invention is chosen to be between 0.6 and 1.6.

The easiest method to improve the adhesive property of the insecticide is to make the water content between 0.5 and 5% by weight. Insecticide with this water content will come in contact with, and stick to the rough surfaces of the foundation 2 and floor beams 5.

For example, even with a water content at or below 0.5% by weight, an insecticide, which is 80% or more, by weight, in a very finely powdered state, with particles smaller than 200 mesh, will adhere well to the foundation 2 and floor beams 5.

Insecticide, with adhesion due to its very finely powdered state, or due to its water content, will stick to all the exposed surfaces under the building floor. In particular, it will adhere well even to the vertical surfaces of the foundation 2, the floor beams 5, and the support beams 7, as well as to the under surfaces of the floor boards 8. To make the the insecticide, applied in this state, even more permanent, a bonding adhesive may be mixed with, or atomized together with the insecticide.

Bonding adhesives, like urethane or vinyl acetate type adhesives, which harden with water, can be used for mixing with the insecticide. To avoid clogging of the insecticide-bonding adhesive mixture prior to ejection from the nozzle, the bonding adhesive may be mixed into the insecticide at the tip of the nozzle.

The amount of bonding adhesive mixed with the insecticide to give it a lasting adhesive property can be extremely small. Furthermore, since the applied insecticide's effectiveness is greatly reduced if it is completely covered by bonding adhesive, the amount of bonding adhesive is chosen to be 30% or less, by weight, of the mixture, and more desirably, 20% or less.

The flow rate and exit velocity of the insecticide from the nozzle can be adjusted by the air pressure applied inside the insecticide dispenser and the diameter of the nozzle opening. Increasing the air pressure increases the insecticide flow rate and exit velocity from th nozzle. Accordingly, high air pressure not only reduces the insecticide spraying time into the area under the building floor, but also increases the flow energy of the insecticide into the air. This increases the degree of disturbance of the air under the building floor, and enables insecticide to get into even the narrowest crevices. However, if the dynamic pressure of the jet of insecticide is too high, friction and abrasion in the hosing and nozzle become appreciable, and further, the insecticide dispenser and compressed air source must be high pressure equipment. Insecticide sprayed under the building floor with a pressure on the order of 2 $Kg/cm^2$ is forcefully stirred around with the air to coat all the exposed surfaces, adhere in crevices, and penetrate into hidden areas exposed through crevices. Therefore, the compressed air pressure to spray insecticide out of the nozzle is normally set at or above 2 Kg/cm$^2$. For example, air pressure is set in the 2 to 15 Kg/cm$^2$ range, and ideally is chosen in the 4 to 10 Kg/cm$^2$ range.

The nozzle diameter is normally set between 1 and 20 mm, and ideally is chosen to be between 3 and 10 mm.

In experiments performed by the inventor, 5 Kg of insecticide were applied in 1 min with a nozzle diameter of 6 mm and an air pressure of 6 Kg/cm$^2$.

The quantity of insecticide applied is established by considering the effectiveness of the insecticide, its specific gravity, and the degree of extermination desired, etc. Normally, for carbamate type insecticides, a lsquare m area is sprayed with 10 to 500 g of insecticide, and ideally a quantity between 20 and 200 g is applied. This application quantity also does not vary greatly for insecticides other than carbamate types.

As shown in FIG. 1, Insecticide application by compressed air pressure does not involve the introduction of a large quantity of air under the building floor. For this reason, there is essentially no leakage of insecticide mixed air from the enclosed area under the building floor during application. Ideally, ventilation holes are plugged, and insecticide is sprayed into an airtight area under the building floor. In this situation, a small amount of air is also injected along with the insecticide, and the pressure in the enclosed area increases slightly. This pressure differential allows more effective penetration of crevices, as well as hidden regions exposed through crevices, in the area under the building floor.

Figure 2:
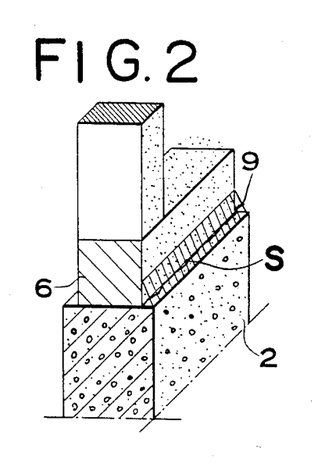
FIG. 2 is a cutaway view of an example of insecticide accumulation in a line along the foundation.

The application method of this invention establishes an accumulation 9 of insecticide along the edge at the top of the foundation 2. Insecticide applied in this manner has exceptional effectiveness which can be maintained over a long period. This accumulation 9 of insecticide forms a continuous line along the top of the foundation 2 when, as shown in FIG. 2, the foundation 2 is made wider than the groundsills 6 to form a shelf on top of the inside wall of the foundation 2. Otherwise, an accumulation of insecticide is formed in the gap between the foundation 2 and the groundsills 6. In addition to being piled up in a large quantity, this accumulation 9 of insecticide occurs on the top of a horizontal surface. Thus, even if the house or building vibrates, or even if the insecticide's adhesion weakens, compared with the insecticide on vertical surfaces or on the under surfaces of the floor boards, it remains in place. Furthermore, since the accumulation is established all along the top edge of the foundation, the invasion of pests into the house or building can be stopped here. In particular, this realizes the feature that termites, that enter from inside the foundation walls, are kept out of the house or building.

The amount of insecticide which adheres to the vertical walls and under surfaces of the foundation 2, the groundsills 6, the support beams 7, the floor beams 5, and the floor boards 8 can be increased if these surfaces are rough rather than smooth. This construction results from the use of composite concrete framework boards rather than smooth metal plates to form the foundation 2, and the use of unsanded and unsmoothed raw lumber to make the groundsills 6, the support beams 7, the floor beams 5, and the floor boards 8.

Figure 3:
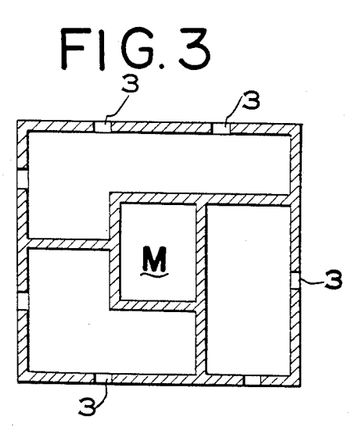
FIG. 3 is cutaway view from above of an example of a foundation layout.

As shown in the overhead view of the foundation 2 in FIG. 3, most of the area under the building can be sprayed from the outside through ventilation holes 3 in the foundation. However, as in FIG. 3, the central region M may not have ventilation holes. For this case, the flooring, or floor covering, over this region is temporarily removed, and either a small hole for the insecticide nozzle is opened in one of the floor boards, or else a gap wide enough for the nozzle is searched for. Once the end of the nozzle is inserted into the central region, insecticide is sprayed into that region.

Insecticide in powdered form is vigorously sprayed by compressed air pressure into the air under the building. Insecticide particles float in this air which is stirred up by the fluid energy of the insecticide jet. To produce this high energy jet, any airtight dispenser, which upon pressurization, forcefully ejects the contained insecticide, which settles to the bottom of that dispenser, where an opening connects to the nozzle through hosing, may be used.

Figure 4:
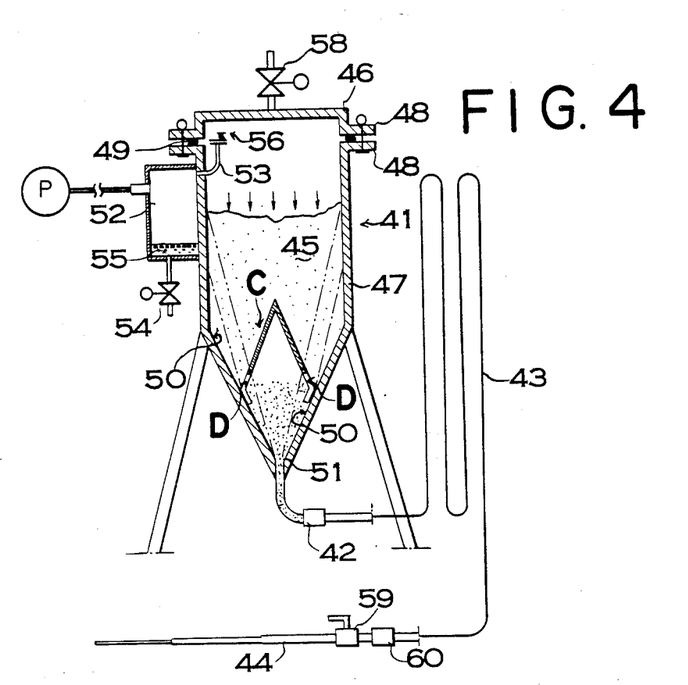
FIG. 4 is a cutaway view of an example of an insecticide spraying device used by this invention.

An example of such a dispenser is illustrated in FIG. 4. This dispenser comprises an insecticide container 41, a connector 42 at the bottom of the container 41, which allows free connection and disconnection of hosing 43, a nozzle 44, which connects to the end of the hosing 43, a compressed air source P, which delivers compressed air to the container 41, and a cone C installed at the bottom of the container 41.

The container 41 has a lid 46 at the top, which allows opening and closing of the top of the container to load insecticide 45, etc. When the lid 46 is closed it forms an airtight seal. This airtight seal is realized by tightening bolts through flanges 48 on the lid 46, and on the container base 47, thus sandwiching a rubber O-ring 49 between the mating surfaces of the flanges 48.

The container 41 is a metal, high pressure vessel constructed to amply withstand interior pressurization during insecticide delivery.

The container 41 shown in FIG. 4 has an overall cylindrical shape with a conically tapered end at the bottom. Compressed air exerts pressure on the top of the insecticide 45 loaded in the container 41.

If compressed air passes through the insecticide 45 and is ejected together with the insecticide, a large quantity of air is introduced under the building with the insecticide 45, and large quantities of insecticide are discharged from the area under the building. To avoid this undesirable effect, the container 41 is normally constructed with a height of 20 cm to 15 m, and ideally, with a height greater than 50 cm, and the slope of the conically tapered bottom 50 is made greater than 45 degrees, and ideally, greater than 50 degrees with respect to horizontal.

Pressure is applied to the surface of the insecticide 45 inside the container 41 by the compressed air above. An insecticide outlet opening 51 for the delivery of pressurized insecticide is provided at the bottom of the conically tapered portion of the container 41, where insecticide collects due to the steep walls 50 of the tapered portion.

Figure 5:
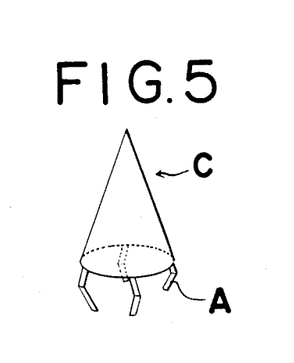
FIG. 5 is an oblique view of an example of a dispenser cone.
Figure 6:
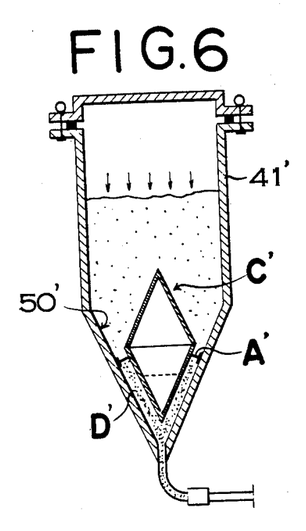
FIG. 6 is a cutaway view of an example of an insecticide dispenser.

As shown in FIG. 5, a cone C is installed to allow all the insecticide in the container 41 to continuously fall to, and be expelled through the opening 51. To prevent residue which occurs in coneless containers, where only the easily expelled insecticide directly above the opening is discharged, the cone C is mounted directly over the opening 51 by legs A which join the bottom of the cone C to the inside wall of the container 41, thus forming gaps D for insecticide to fall through.

To insure that insecticide falls without sticking to the outer surface of the cone C, the surface is smoothly finished and has a steep slope, for example greater than 
45 degrees, and ideally greater than 50 degrees with respect to horizontal.

Ideally, the outside diameter of the bottom of the cone C is approximately half the inside diameter of the container 41, but slightly larger or smaller cones are also possible.

The gaps D through which insecticide falls are formed with a width of 1 cm or more, and ideally, 2 cm or more, to allow the smooth flow of insecticide around the cone C.

The gaps D are adjusted by the shape of the legs A. The legs A are made as narrow as possible, ideally less than or equal to 1 cm, to minimize the accumulation of insecticide on top of the legs. Also for this reason, the legs A extend from the surface of the cone C with the same slope as that surface. The ends of the legs A are bent to mate with the tapered portion of the container 41.

Since the cone C is easily removed from, and inserted into the container 41, this construction has the feature that the container 41 is easy to clean.

The cone C is normally cone shaped, but pyramid shaped structures are also possible.

The cone C, of the insecticide spraying device illustrated in FIG. 6, is a double cone plug formed from a top cone and a bottom cone joined back to back. To establish the fixed gap D, the slope of the bottom cone is made equal to, or approximately equal to the slope of the tapered portion 50 of the container 41.

Legs A extend from the surface of the bottom portion of the cone C and mate with the tapered portion 50 of the container 41 to establish the fixed gap D for insecticide to pass through.

This double cone structured cone C is also easily removed from, and inserted into the container 41.

As shown by the broken line of FIG. 6, the bottom cone of the double cone structure may also be a frustrum.

In insecticide spraying devices with cones installed in the bottom, the insecticide level decreases as it is ejected from the nozzle, but since a cone is located over the bottom opening, insecticide falls to that opening through the gap between the cone and the container wall. Since this gap is closer to the vertical wall of the container than the bottom opening, the amount of insecticide residue can be decreased with a cone installed.

Suppose that insecticide is discharged from the bottom opening of a coneless container, and as shown by the double dotted broken line of FIG. 4, residual insecticide sticks to the inside wall of the container. This residue quantity is greatly reduced, to that shown by the single dotted broken line, when a cone is used. This is simply because the gap through which insecticide falls is close to the vertical wall of the container.

In other words, insecticide smoothly discharges through gap between the cone and the container wall until only the insecticide residue indicated by the single dotted line of FIG. 4 remains. This realizes the feature that, since compressed air at the top of the container does not get to the bottom opening until only a small residue of insecticide remains, insecticide can be sprayed without air mixture.

The gap between the cone and the container wall above the bottom opening not only allows the insecticide inside to be discharged without leaving residue, but also improves the delivery of insecticide to the bottom opening. For example, during the discharge of insecticide from the container shown in FIG. 4 through the gap D and out the bottom opening 51, even if insecticide at a point above and to the right of the bottom opening 51 is not smoothly delivered to that opening, if insecticide at a point above and to the left is delivered to the bottom opening 51, insecticide delivery is uninterrupted. Because the gap D is distributed over a much wider area than the bottom opening 51, insecticide can reach the bottom opening through any portion of the gap, and insecticide is effectively discharged from the container through the bottom opening.

This type of insecticide spraying device is easy to use, continuously discharges insecticide held in the container without introducing large quantities of air to the spray, and does not leave a large residue in the container. Therefore, all the insecticide in the container can be efficiently utilized.

Also, since large quantities of air are not discharged during spraying, this realizes the feature that large quantities of insecticide can be effectively and efficiently applied with little compressed air consumption.

Furthermore, since large quantities of air are not discharged during spraying, insecticide is not scattered in all directions, and insecticide already sprayed into the air under the building is not blown out of that enclosed area. Hence, the characteristics of convenience and simplicity of operation and are realized.

To prevent humidity in the air from condensing and hardening the insecticide in the container 41 shown in FIG. 4, a compressed air reservoir 52, which connects to the container base 47 through an air pipe 53, is provided. A water sump 55 and a sump valve 54 are provided at the bottom of the reservoir 52, while the top of the reservoir 52 opens into the top of the container base 47 through the air pipe 53 and a one-way check valve 56 on the end of that air pipe.

The one-way check valve 56 is spring loaded by the compression spring 57 to keep compressed air and insecticide in the container base 47 from flowing back into the compressed air reservoir 52.

When water collects at the bottom of the reservoir 52, it is drained by opening the sump valve 54.

As shown in FIG. 4, a vent 58 is provided in the lid 46 to release compressed air inside the container base 47. Prior to opening the lid 46, the vent 58 should be opened, and the pressure inside the container base 47 should be reduced to atmospheric.

An insecticide spray adjust valve 59 regulates pressure in the delivery line comprising the bottom opening 51, the hosing 43, and the nozzle 44. As shown in FIG. 4, the most convenient location for the spray adjust valve 59 is on the nozzle 44, in easy reach of the operator, and at the source of the insecticide jet.

Further, the nozzle 44 is made as a telescoping structure for convenience of use. The nozzle 44 joins to the hosing 43 through a connector 60.

Any source which can deliver compressed air, for example, an air compressor, etc. can be used as the compressed air source P. However, since the insecticide spraying device used in this invention consumes little air, a small bottle of compressed gas may also be used as the compressed air source.

FIG. 7 shows an example of a nozzle which atomizes liquid bonding adhesive together with insecticide. As illustrated, a venturi 22, with a liquid bonding adhesive nozzle 23 inserted at the low pressure point, is fixed to the end of the insecticide nozzle 21. The bonding adhesive nozzle 23 is either directly connected to the liquid bonding adhesive dispenser 25, or else it is connected to that dispenser through a delivery pump 24.

Figure 7:
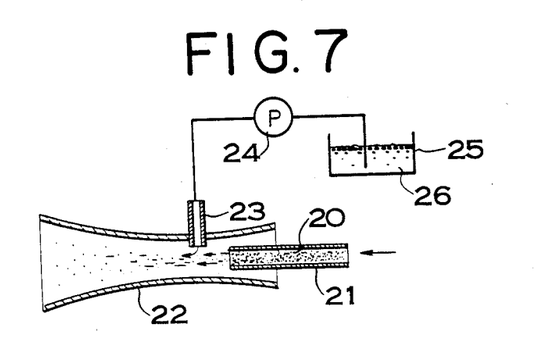
FIG. 7 is a cutaway view of an example of a nozzle for mixing liquid bonding adhesive with insecticide.

When insecticide is sprayed through this nozzle, liquid bonding adhesive 26 is sucked into the rapidly flowing stream of insecticide in the venturi 22 by the action of Bernoulli's theorem. The bonding adhesive 26 mixes with the insecticide 20, and is sprayed into the air under the building. The atomized particles of this mixture are distributed to the exposed surfaces under the building by air turbulence created by the insecticide jet. In this case, since insecticide adheres to surfaces through the action of the bonding adhesive, insecticide can be solidly attached to surfaces without coming loose for long periods. The bonding adhesives previously described can be used in this system.

To establish a narrow jet of atomized insecticide, the end of the nozzle 21 is either a cylindrical pipe as shown in FIG. 7 or else the end of the pipe narrows down to a smaller diameter.

The method of using the insecticide spraying device of FIG. 4 is as follows. The lid 46 of the insecticide dispenser container 41 is closed and sealed to an airtight seal after insecticide 45 has been loaded into the container base 47. Compressed air is introduced into the container base 47 from the compressed air source P. At this stage, insecticide 45 is ejected from the nozzle 44 when the spray adjust valve 59 is opened, and it is stopped when the valve 59 is closed. The quantity of insecticide sprayed can be regulated by how far the spray adjust valve 59 is opened. The container 41 is reloaded with insecticide by first venting the high pressure section to the atmosphere through the vent 58, opening the lid 46, adding insecticide, sealing the lid 46, and once again pressurizing the system with compressed air. If all the insecticide within the hosing 43 and the nozzle 44 is completely discharged upon completion of spraying, clogging of these parts with hardened insecticide can be prevented.

In this insecticide spraying method, powdered insecticide with an average particle size less than 100 mesh is ejected at a high speed, by the action of compressed air, into the area under the building. Turbulence is induced in the air under the building by the rapid fluid motion of the many insecticide particles sprayed into that area. This air-insecticide turbulence enables complete insecticide distribution in the area under the building, and enables insecticide to adhere to all exposed surfaces, adhere in crevices, and even penetrate into hidden areas exposed through crevices.

By the method illustrated in FIG. 1, using a powdered insecticide with an apparent specific gravity of 1.2, and a compressed air pressure of 6 Kg/cm$^2$, the inventor has sprayed 70 g of insecticide per square meter of area under a building, then examined the results of the application by removing the flooring and floor boards. Insecticide adhered to all exposed surfaces as well as penetrating between crevices in the floor boards to adhere to the underside of the flooring (in this case tatami flooring). Insecticide also adhered to the top of the foundation extending out from under the groundsills, all surfaces of the support beams fixed to the floor beams, the under surfaces of the floor beams and the floor boards, and in all the crevices of the groundsills, the support beams, the floor beams, and the floor boards.

Therefore, even if insecticide on the ground loses its effectiveness rapidly, all paths into the building are cut off, and the entry of harmful insects can be effectively prevented.

This means that insecticides, such as carbamate types which degrade rapidly in the ground, can be used, and effective long term pest prevention can be realized with minimum environmental impact.

Further, since complete insecticide application can be achieved by simply spraying insecticide at a high speed from the end of a nozzle inserted into the area under the building, there is no need for the operator to physically enter that area, and hence, working conditions can be greatly improved.

Furthermore, powdered insecticide is distributed to even the narrowest crevices under the building by air turbulence caused by the high fluid energy of the jet of insecticide itself. For this reason, there is no need to introduce large quantities of air into the enclosed area under the house or building, the leakage of insecticide from that area can thereby be minimized, and the environmental effects of the insecticide around the house or building can also be minimized. In addition, all the insecticide sprayed can be contained, and effectively used in the area under the building.

Figure 8:
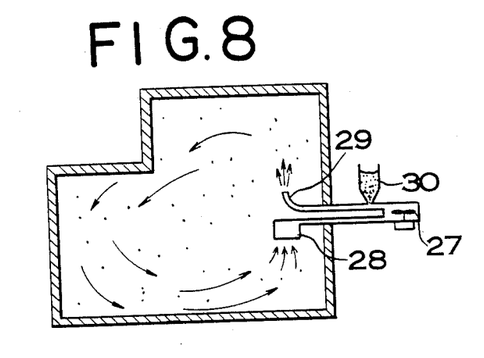
FIGS. 8 and 9 are simplified top and side cutaway views respectively of a different type of insecticide spraying device.
Figure 9:
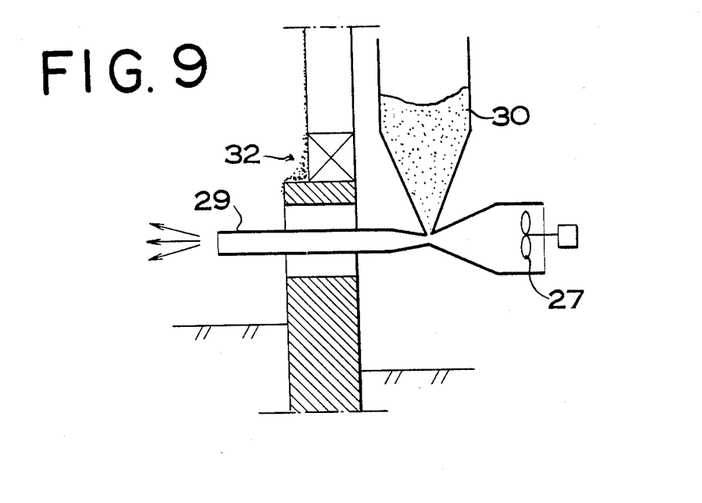

FIGS. 8 and 9 shows a device for stirring up the air under a building and delivering insecticide through an air duct using a fan 27.

This device comprises an inlet duct 28 to suck in air, an exhaust duct 29 to blow air out, a forced circulation type fan 27 between the inlet and exhaust ducts, and an insecticide dispenser 30.

The openings of the inlet duct 28 and the exhaust duct 29 face opposite directions in order to effectively stir up the air under the building.

Insecticide falls from the dispenser 30, which has a tapered bottom portion, into the exhaust duct 29, from which it is blown into the area under the building to float in, and be circulated with the air in that area. The airborne particles of insecticide are circulated about the area under the building, precipitate to the surfaces there, and create an accumulation 32 in a line along the foundation.

Since this method distributes insecticide by intaking as well as exausting the air-insecticide mixture, leakage of insecticide out of the enclosed area under the building can be reduced to the extreme.

Figure 10:
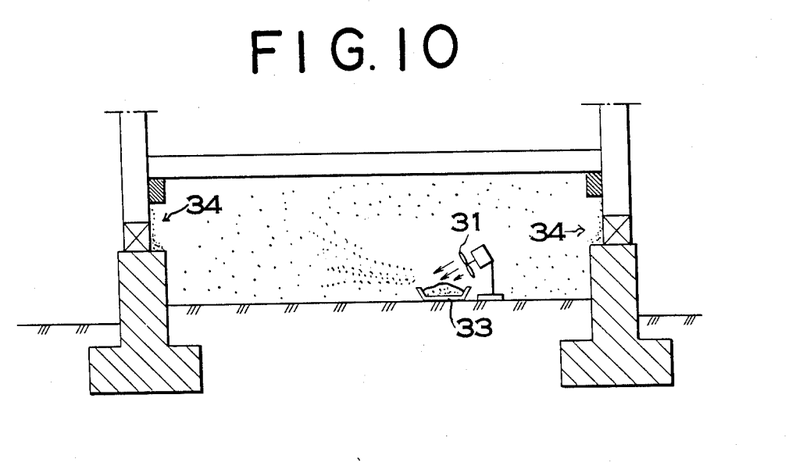
FIG. 10 is a cutaway view of still another type of insecticide spraying device.

As shown in FIG. 10, another possible application method, which creates the accumulation 33 in a line along the foundation, is by setting a fan 31 aimed at the insecticide 33 under the building, and inducing a turbulent air-insecticide flow by operation of the fan 31.

The method of creating a barrier to harmful insects by creating an accumulation of powdered insecticide, precipitated from turbulence induced air under the building, in a line along the top of the foundation, as shown in FIG. 1 and FIG. 2, where the groundsills are made narrower than the foundation on which they rest, can be accomplished without breaks in the barrier, and without the troublesome task of attaching a trough or groove all along the foundation to hold insecticide. The feature that a continuous line of accumulated insecticide forming an effective barrier to harmful insects can be realized on any type of foundation is particularly important for cases where the foundation takes on a complicated shape, or has outcroppings and voids, making former methods of attaching a trough or groove nearly impossible.

Building construction which provides a place for insecticide to accumulate along the top of the foundation not only allows large quantities of insecticide to pile up there, but also provides a horizontal surface to stabley hold the insecticide in that pile for a long period. Thus, even if the insecticide's adhesion weakens, compared with the insecticide attached to vertical surfaces or to the under surfaces of the floor boards, the insecticide accumulation on top of the foundation will remain in place. Furthermore, since the accumulation is established in a continuous line all along the top edge of the foundation, the invasion of pests into the house or building can be stopped at that point. In particular, termites, which enter from inside the foundation walls, can be kept out of the house or building.

Further, since the line of accumulated insecticide on the foundation is established by the dispersion of insecticide powder in the turbulence induced air under the building, insecticide can be applied all along the foundation extremely quickly and simply.

The establishment of a continuous barrier to harmful insects all along the foundation means that insect penetration into the home or building can be completely stopped at that point. Therefore, even if insecticide on the ground loses its effectiveness rapidly, all crawling insects' paths into the building are cut off, and the entry of harmful insects can be effectively prevented.

As mentioned previously, this means that insecticides, such as carbamate types which degrade rapidly in the ground, can be used, and effective long term pest prevention can be realized with minimum environmental impact.

Further, since the line of accumulated insecticide along the foundation can be achieved by the dispersion of insecticide mixed with turbulent air under the building, there is no need for the operator to physically enter that area, no need for him to breathe insecticide, and hence, the operator's working conditions can be greatly improved. In addition, insecticide can be applied to extremely small areas under buildings where workers could not possibly enter.

Furthermore, in terms of the quantity of insecticide piled up, the accumulation of a line of insecticide along the top of the foundation is in no way inferior to former methods of fixing a trough or groove along the foundation and filling it with insecticide. Thus, insecticide effectiveness can be extended over a long period.

Finally, since the area under the building can be replenished with insecticide simply by mixing insecticide with turbulent air in that area, reapplication can easily be performed periodically, and maintenance of complete long range harmful insect extermination can also be realized.

What is claimed is:

1. A method of exterminating harmful insects under the floor of a house or building, which consists essentially of:
   (a) using an adhesive insecticide in a fine powdered state with an average particle size less than 100 mesh;
   (b) loading the powdered insecticide into an airtight dispenser having top and bottom portions, said top portion having an inlet and said bottom portion having an outlet for insecticide, so that the insecticide outlet opening in said bottom portion is blocked with insecticide;
   (c) pressurizing to from 2 to 15 kg/cm$^2$ with air the dispenser from said inlet in said top portion to deliver insecticide under pressure from said insecticide outlet opening in said bottom portion to a nozzle whose diameter is between 1 and 20 mm;
   (d) spraying a narrow jet said insecticide in atomized form at a high speed, from said nozzle, into the enclosed area under the floor of the building;
   (e) agitating the air, within said enclosed area under the floor of the building, into a turbulent state with the fluid energy of the insecticide spray; and
   (f) dispersing said insecticide with the turbulent air so that all exposed surfaces and crevices in said enclosed are under the floor of the building are covered with said insecticide.

2. The method of exterminating harmful insects under the floor of a house or building as claimed in claim 1 using insecticide in a fine powdered state with an average particle size less than 200 mesh.

3. The method of exterminating harmful insects under the floor of a house or building as claimed in claim 1 using insecticide having a water content of 0.5% or greater by weight.

4. The method of exterminating harmful insects under the floor of a house or building as claimed in claim 1 in which the ventilation holes in the foundation are blocked, and said insecticide is sprayed into said enclosed area under the floor of the building.

5. The method of exterminating harmful insects under the floor of a house or building as claimed in claim 1 in which said insecticide is discharged from said nozzle by pressurizing said airtight dispenser, loaded with said insecticide, with compressed air at a pressure between 2 and 15 Kg/square cm.

6. A method of exterminating harmful insects under the floor of a house or building, which consists essentially of:
   (a) constructing the building's foundation and groundsills so that the groundsills are narrower than the top of the foundation, and a shelf, where insecticide can accumulate, is established all along a top of the inside wall of the foundation;
   (b) introducing powdered insecticide from a dispenser having top and bottom portions, with an inlet in said top portion and an outlet nozzle whose diameter is between 1 and 20 mm for insecticide in said bottom portion, wherein the dispenser is pressurized with air to from 2 to 15 kg/cm$^2$ from said inlet in the top portion and insecticide is discharged from said outlet nozzle in a narrow jet in the bottom portion at high speed in atomized form so that it floats in the air inside the enclosed area under the floor of the building;
   (c) agitating the air-insecticide mixture inside said enclosed area under the floor of the building; and
   (d) establishing an accumulation of insecticide in a line along the top of said foundation so that a barrier is formed preventing the intrusion of harmful insects 7. A method of exterminating harmful insects under the floor of a house or building as claimed in claim 6 in which said shelf, where insecticide can accumulate along the top of the foundation, is between 5 and 50 mm wide.

8. The method of exterminating harmful insects under the floor of a house or building as claimed in claim 6 in which the ventilation holes in the foundation are blocked, and said insecticide is sprayed or blown into said enclosed area under the floor of the building.

9. The method of exterminating harmful insects under the floor of a house or building as claimed in claim 6 in which the air, containing particles of said insecticide, inside said enclosed area under the floor of the building is forcefully agitated with a fan.

* * * * *